(No Model.)

D. M. & T. H. PARRY.
METHOD OF SECURING TIRES TO THE RIMS OF WHEELS.

No. 429,221. Patented June 3, 1890.

Witnesses:
N. E. C. Whitney.
Harry W. Ballard.

Inventors.
David M. Parry and
Thomas H. Parry,
By Joseph A. Minturn,
Attorney.

THE NORRIS PETERS CO., PHOTO-LITHO., WASHINGTON, D. C.

UNITED STATES PATENT OFFICE.

DAVID M. PARRY AND THOMAS H. PARRY, OF INDIANAPOLIS, INDIANA.

METHOD OF SECURING TIRES TO THE RIMS OF WHEELS.

SPECIFICATION forming part of Letters Patent No. 429,221, dated June 3, 1890.

Application filed August 8, 1889. Serial No. 320,157. (No model.)

*To all whom it may concern:*

Be it known that we, DAVID M. PARRY and THOMAS H. PARRY, citizens of the United States, residing at Indianapolis, in the county of Marion and State of Indiana, have invented certain new and useful Improvements in the Method of Securing Tires to the Rims of Wheels; and we do hereby declare the following to be a full, clear, and exact description of the invention, such as will enable others skilled in the art to which it appertains to make and use the same.

This invention appertains to the manufacture of vehicle-wheels, and especially relates to an improved method of securing the tires to the rims of wheels, the object of the invention being to overcome the necessity of securing the tires by means of bolts, as heretofore.

The invention consists, essentially, in a method of securing tires to the rims or fellies of wheels, which consists in first shrinking or placing the welded tire upon or around the rim, and subsequently pressing a portion of both edges of the tire over upon and into the sides of the felly, thereby producing side flanges that firmly grasp the sides of the felly, substantially as hereinafter described, and set forth in the claims.

It also consists in that improvement in the method of securing tires to wheels which consists, first, in securing a tire to the rim of the wheel of slightly-greater width than the width of the felly, and subsequently passing the tired rim between rolls and pressing the surplus width of the tire over upon the sides of the felly, substantially in the manner hereinafter described and claimed.

Figure 1:
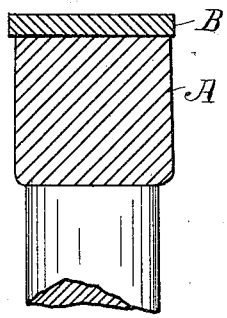
Figure 2:
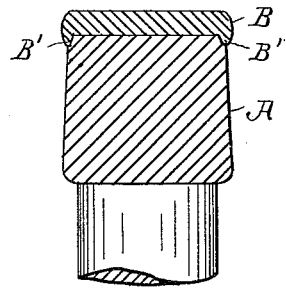
Figure 3:
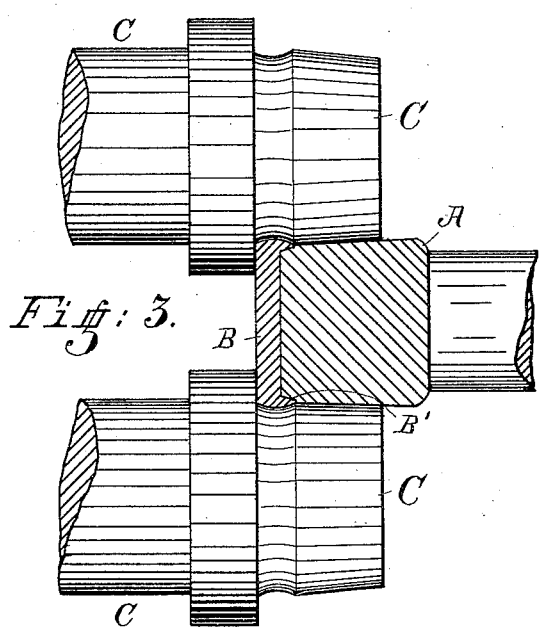
Figure 4:
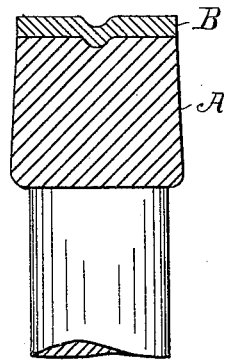

Figure 1 of the drawings illustrates in section a portion of a wheel-rim, showing the tire in position to be upset; Fig. 2, a like view showing the tire pressed over upon the felly; Fig. 3, details of suitable rolls for pressing or upsetting the tire over upon the felly; and Fig. 4, a sectional detail of the rim, showing the tire beaded peripherally.

We are aware that tires have been constructed with side flanges and afterward shrunk upon the wheel-rims; but such construction has been found very expensive, both in making and setting, and this we do not desire to claim.

In the drawings, A represents the rim of a wheel of ordinary construction, and B represents a flat tire.

The tire B is first placed around the rim of the wheel in the usual manner, it being preferably slightly wider than the width of the felly A, after which it is passed between rolls C, which perform two functions—*i.e.*, straightening the tire and pressing its edges inward over upon and somewhat into the sides of the felly. By this method we are enabled to so press the edges of the tire that flanges B' are produced of sufficient length to prevent lateral displacement of the tire and also bring the sides of the flanges and edge of the tire flush with the sides of the felly, making a smooth and finished joint. This has not, to our knowledge, been heretofore accomplished, and as it is of vast importance to wheel-makers it is our desire to draw a claim of sufficient breadth as to cover a wheel so constructed.

The rolls C may be secured to shafts upon a machine or may be run by hand, as desired. By this construction the use of bolts to secure the tire is obviated. They may be used, however, if desired.

If desired, a groove may be pressed into the outer face of the tire, which would form a bead upon the inner face, which would embed itself into the periphery of the rim, which construction, being new, we desire to claim.

We claim—

1. That improvement in the art or method of securing metal tires to wooden rims of wheels which consists, first, in shrinking the metal tire upon the wooden rim, and subsequently pressing the edges of the tire, which will preferably be of slightly-greater width than the rim, over upon and into the sides of the rim, to bring the edges of the tire flush with the sides of said rim, and forming flanges to prevent displacement, substantially as described.

2. That improvement in the method of securing metal tires to wooden rims of wheels which consists in placing a flat welded tire thereon of slightly-greater width than the width of the felly, passing the same between rolls which straightens it and upsets its edge over upon and into the sides of the felly, substantially as described.

3. That improvement in the method of securing metal tires to wooden rims of wheels which consists in first placing a flat tire upon the rim, and subsequently pressing a portion of said tire into the periphery or other part of the rim, substantially as described, and for the purpose set forth.

In testimony whereof we affix our signatures in presence of two witnesses.

DAVID M. PARRY.
THOMAS H. PARRY.

Witnesses:
JOSEPH A. MINTURN,
N. E. C. WHITNEY.